Jan. 29, 1957  A. RUSSO  2,779,117
DUAL DISPLAY LETTERED CHAIN SCREEN
Filed May 20, 1954  2 Sheets-Sheet 2

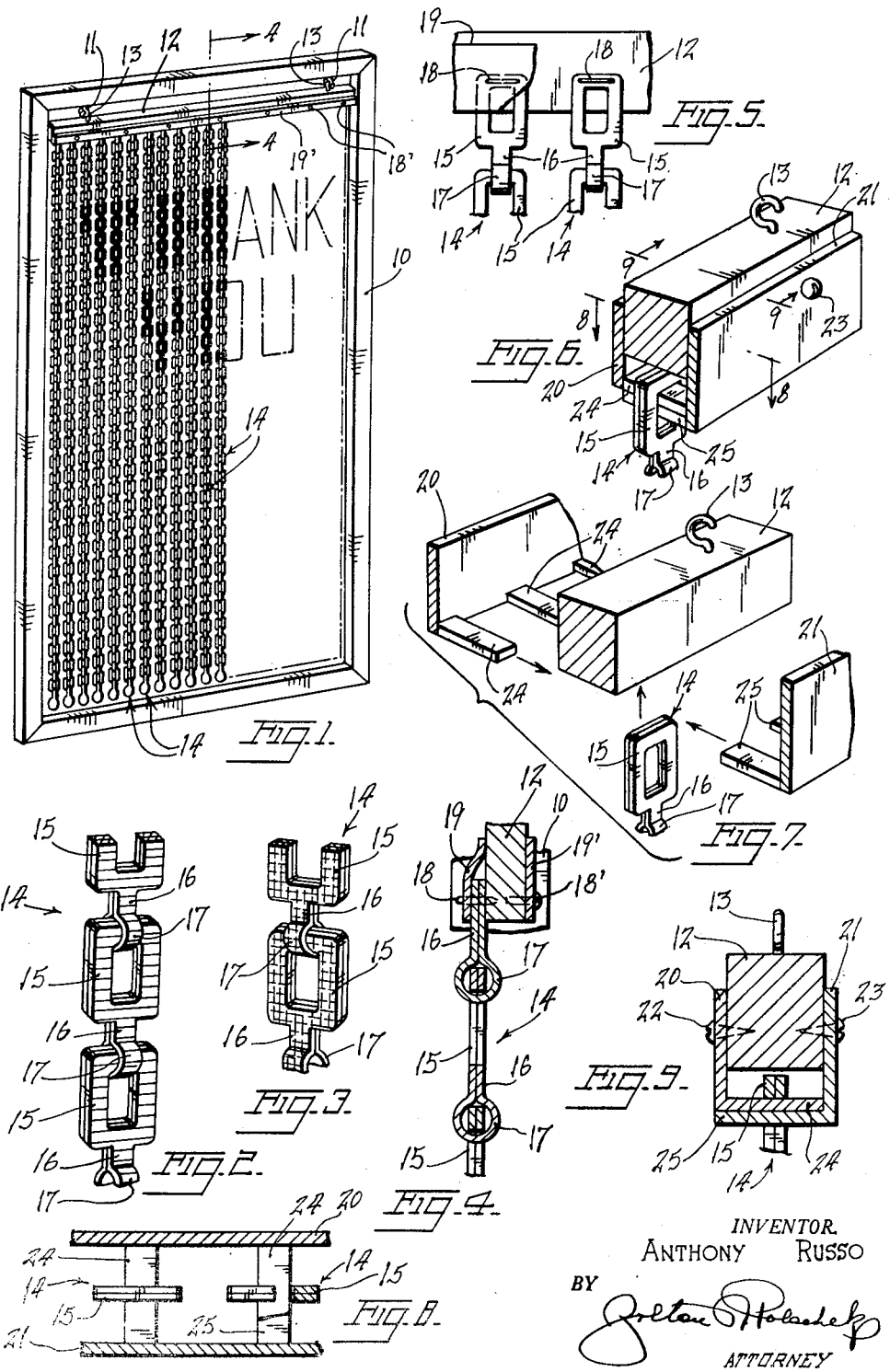

INVENTOR.
ANTHONY RUSSO
BY
ATTORNEY

United States Patent Office

2,779,117
Patented Jan. 29, 1957

2,779,117

DUAL DISPLAY LETTERED CHAIN SCREEN

Anthony Russo, Brooklyn, N. Y.

Application May 20, 1954, Serial No. 431,162

6 Claims. (Cl. 40—128)

This invention relates to screens and, more particularly, to a lettered chain screen display.

It is an object of the present invention to provide a display screen composed of downwardly projecting chains some of which are painted in different colors from the rest, so as to spell out any desired word or design, at one or both sides of the display screen.

It is another object of the present invention to provide a display screen of the above type including improved means for connecting the chains of the screen to an overhead support element.

Other objects of the present invention are to provide a lettered chain screen display bearing the above objects in mind which is of simple construction, inexpensive to manufacture, has a minimum number of parts, is easy to use and efficient in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the invention shown mounted in a door frame.

Fig. 2 is a fragmentary perspective view on an enlarged scale of a portion of one of the chains.

Fig. 3 is a fragmentary rear perspective view thereof.

Fig. 4 is a vertical sectional view taken along the line 4—4 of Fig. 1.

Fig. 5 is a sectional view taken of Fig. 4 showing a means for permanently connecting the chains to an overhead support element.

Fig. 6 is a fragmentary perspective view of a modified construction which simplifies the connection of the several chains to an overhead support element while at the same time permitting interchangeability of the chains.

Fig. 7 is a fragmentary, exploded perspective view of the Fig. 6 construction.

Fig. 8 is a sectional view taken substantially on line 8—8 of Fig. 6.

Fig. 9 is a transverse sectional view taken substantially on line 9—9 of Fig. 6.

Figure 10:
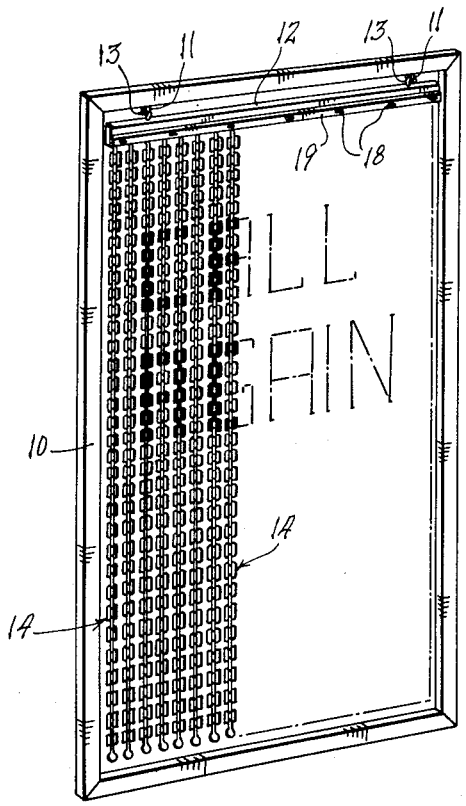
Fig. 10 is a rear perspective view of Fig. 1.

A transverse bar 12 has screwed thereinto at each end a hook 13 whereby to removably support the same from the eyes 11 of a door frame 10.

A plurality of chains, indicated generally at 14, are provided (Figs. 2 and 3) and include a flat ring portion 15, a neck portion 16, and a looped portion 17 connected to the ring portion 15 of the adjacent link.

The chains 14 are formed of double layers for a purpose which will hereinafter become clear.

The upper ends of a plurality of laterally spaced chains 14 are secured behind the bar 12 by means of staples 18, a strip 19 overlying the upper ends of the chains (Fig. 4). A second strip 19' is secured to the front face of the bar 12 by means of bolts 18', the bolts passing fully through the bar 12 and the strips 19, 19' and being provided with nuts to hold the bar and strips assembled with one another.

Some of the chain links are colored differently from the remainder of the chains at one or both sides, so as to spell out any desired word or design (Fig. 1). These spelled out words or messages may be the same, or may be different at the opposite sides of the chain links. For example, the designs may be formed by links colored red on their forward faces, while the remaining chains and the rear faces of the red colored links are colored yellow (Figs. 2 and 3). In other words, a certain word or words can be on one side only, or on both sides, or alternatively, one side may be left without any word or words. Then again, one side may have one word or word combination, and the other side a different word or word combination.

In Figs. 6–9 there is shown a modified construction wherein the staples 18 and cover strips 19, 19' are not used. Instead, the chains 14 are connected to the bar 12 by means of strips 20, 21 each of which is formed with openings spaced uniformly along its length, through which openings screws 22, 23 extend into the opposite sides of the bar 12 to fixedly but removably secure the strips to said bar. The lower edge portions of the strips 20, 21 depend below the underside of the bar 12, and are formed with longitudinally spaced teeth, that extend transversely of the bar. Strip 20, thus, has straight, spaced apart teeth 24 integrally formed thereupon, the teeth 24 extending inwardly of the assembly below and in closely spaced relation to the bar 12, with the free ends of the teeth 24 terminating against the inner surface of the depending lower edge portion of the strip 21. Strip 21 is formed with correspondingly spaced teeth 25, the teeth 25 being extended below and in contact with the respective teeth 24, and extending fully to the outer surface of the depending edge portion of strip 20, as best shown in Fig. 9.

The several pairs of superposed teeth 24, 25 extend through the openings of the uppermost links of the chains 14, to suspend the chains from the bar 12. In assembling the several parts, one would first secure the strip 20 to one side of the bar 12, by means of the screws 22, the strip 20 extending the full length of bar 12 and having teeth 24 spaced equal distances apart throughout its length. After the strip 20 has been secured to the bar, the several chains 14 are suspended from the teeth 24. After the chains 14 are all in place upon the teeth 24, the strip 21 is secured to the opposite face of bar 12, with the teeth 25 extending into position under teeth 24, through the openings of the uppermost links of the several chains.

Strip 21 is then secured fixedly in place by means of screws 23, and it will be seen that the several chains will be retained in position, without possibility of their becoming accidentally disassembled from the other parts.

The construction shown in Figs. 6–9 permits interchangeability of the chains, and if one chain is broken in some manner, the strip 21 is merely removed and a new chain is substituted for the broken chain, after which the strip 21 is resecured to the bar 12.

The construction shown in Figs. 6–9 has the further advantage in that it does not require individual stapling of the chains to the bar 12, or connection of each chain to the bar by some other type of separate fastening element. Instead, the assembly time is reduced substantially, since the individual fastening elements for the chains are dispensed with, it being necessary only to apply screws 22, 23, a relatively small number of said screws being required.

Fig. 10 shows a rear perspective view of the invention with words "Call Again" featured thereon to indicate that the message is different at the back of the curtain from the front message.

Figure 11:
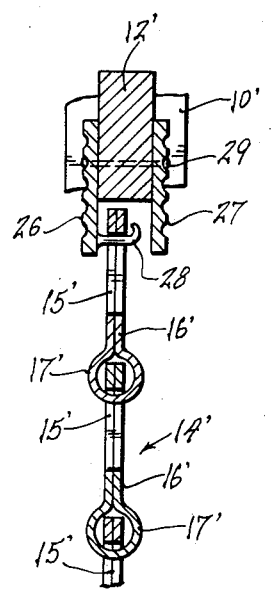
Fig. 11 is a similar view to Fig. 4 but showing another form of the invention.
Figure 12:
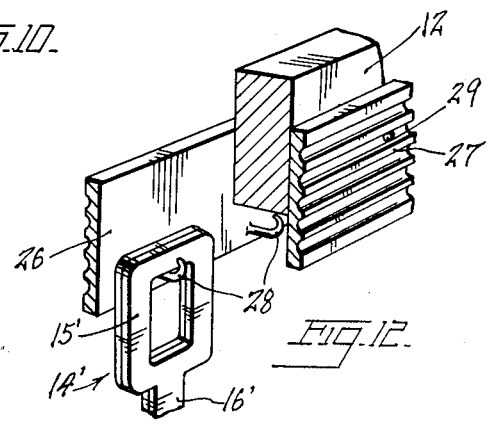
Fig. 12 is a fragmentary detail perspective view of the modification shown in Fig. 11.

In Figs. 11 and 12, strips 26 and 27 are shown to be secured to a supporting bar 12' projecting from a doorframe 10' by means of rivets, screws or the like 29. The lower end of one of these strips 26 is provided with a plurality of spaced hooks 28 adapted to support the chains 14'. This form of the invention is similar to the previous form and similar parts may be recognized by corresponding reference numerals with a prime added.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An article of the class described comprising a transverse member, means for removably mounting said transverse member at the top of a door frame or the like, a plurality of depending chains, means for securing the upper ends of said chains to said transverse member, certain of the links of said chains being colored differently from the remainder of said chains whereby to spell out any desired word or pattern, each of said chains comprising a plurality of links, each of said links consisting of a flat ring portion, a narrow neck and a loop surrounding the adjacent ring.

2. An article of the class described comprising a transverse member, means for removably mounting said transverse member at the top of a door frame or the like, a plurality of depending chains, means for securing the upper ends of said chains to said transverse member, certain of the links of said chains being colored differently from the remainder of said chains whereby to spell out any desired word or pattern, each of said chains comprising a plurality of links, each of said links consisting of a flat ring portion, a narrow neck and a loop surrounding the adjacent ring, each of said links being formed of double layers said neck and ring portion lying in the same plane.

3. An article of the class described comprising a transverse member, means for removably mounting said transverse member at the top of a door frame or the like, a plurality of depending chains, and means for securing the upper ends of said chains to said transverse member, said means comprising a pair of strips, said strips being secured to opposite faces of the transverse member, and teeth extending inwardly from each strip toward the other strip, said teeth passing through the upper ends of the chains.

4. An article of the class described comprising a transverse member, means for removably mounting said transverse member at the top of a door frame or the like, a plurality of depending chains, and means for securing the upper ends of said chains to said transverse member, said means comprising a pair of strips, said strips being secured to opposite faces of the transverse member, and teeth extending inwardly from each strip toward the other strip, said teeth passing through the upper ends of the chains, the teeth of each strip being spaced apart longitudinally of said strip and corresponding in number to the number of said chains, for suspension of each chain from one tooth of each strip.

5. An article of the class described comprising a transverse member, means for removably mounting said transverse member at the top of a door frame or the like, a plurality of depending chains, and means for securing the upper ends of said chains to said transverse member, said means comprising a pair of strips, said strips being secured to opposite faces of the transverse member, and teeth extending inwardly from each strip toward the other strip, said teeth passing through the upper ends of the chains, the teeth of each strip being spaced apart longitudinally of said strip and corresponding in number to the number of said chains, for suspension of each chain from one tooth of each strip, said strips respectively having one longitudinal edge projecting below the bar, said teeth being formed on said edge and extending transversely of the bar in spaced relation to the underside thereof.

6. An article of the class described comprising a transverse member, means for removably mounting said transverse member at the top of a door frame or the like, a plurality of depending chains, and means for securing the upper ends of said chains to said transverse member, said means comprising a pair of strips, said strips being secured to opposite faces of the transverse member, and teeth extending inwardly from each strip toward the other strip, said teeth passing through the upper ends of the chains, the teeth of each strip being spaced apart longitudinally of said strip and corresponding in number to the number of said chains, for suspension of each chain from one tooth of each strip, said strips respectively having one longitudinal edge projecting below the bar, said teeth being formed on said edge and extending transversely of the bar in spaced relation to the underside thereof, the teeth of one strip being overlapped with corresponding teeth of the other strip, each pair of overlapping teeth extending through the uppermost link of a chain.

References Cited in the file of this patent

UNITED STATES PATENTS

| | | |
|---|---|---|
| 485,229 | Reed | Nov. 1, 1892 |
| 496,423 | Locke | May 2, 1893 |
| 812,605 | Slama | Feb. 13, 1906 |
| 867,554 | Brundell | Oct. 1, 1907 |
| 1,247,886 | Shaw | Nov. 27, 1917 |
| 1,487,794 | Melaun | Mar. 25, 1924 |